United States Patent [19]

Murty et al.

[11] Patent Number: 5,091,679
[45] Date of Patent: Feb. 25, 1992

[54] ACTIVE VEHICLE SUSPENSION WITH BRUSHLESS DYNAMOELECTRIC ACTUATOR

[75] Inventors: Balarama V. Murty, Sterling Heights; Rassem R. Henry, Mt. Clemens, both of Mich.

[73] Assignee: General Motors Corporation, Detroit, Mich.

[21] Appl. No.: 717,425

[22] Filed: Jun. 18, 1991

Related U.S. Application Data

[63] Continuation-in-part of Ser. No. 540,989, Jun. 20, 1990, abandoned.

[51] Int. Cl.$^5$ .............................................. B60K 16/00
[52] U.S. Cl. ..................................... 318/153; 318/254; 180/2.2; 180/65.3; 180/165
[58] Field of Search ............... 318/114, 115, 119, 135, 318/151, 152, 153, 254; 177/184, 185; 180/2.1, 2.2, 65.1, 65.3, 165, 41, 902; 280/840, 688, DIG. 1

[56] References Cited

U.S. PATENT DOCUMENTS

| | | | |
|---|---|---|---|
| 3,559,027 | 1/1971 | Arsem | 180/165 X |
| 3,861,487 | 1/1975 | Gill | 180/65.3 |
| 3,911,829 | 10/1975 | Ross et al. | 105/57 R |
| 3,981,204 | 9/1976 | Starbard | 74/34 |
| 4,032,829 | 6/1977 | Schenavar | 320/61 |
| 4,113,047 | 9/1978 | Turner | 180/65.3 |
| 4,295,538 | 10/1981 | Lewus | 180/165 |
| 4,387,781 | 6/1983 | Ezell et al. | 180/65.3 |
| 4,544,868 | 10/1985 | Murty | 318/254 |
| 4,815,575 | 3/1989 | Murty | 188/299 |
| 4,892,328 | 1/1990 | Kurtzman et al. | 280/707 |
| 4,967,359 | 10/1990 | Sugasawa et al. | 364/424.05 |
| 5,027,048 | 6/1991 | Masruv et al. | 318/806 |
| 5,036,934 | 8/1991 | Nishina et al. | 180/165 |

OTHER PUBLICATIONS

Hopkins et al., Research Disclosure #29575, Nov. 1988, "Quasi-Static Load Compensating Vehicle Suspension", General Motor Corp.

Primary Examiner—Bentsu Ro
Attorney, Agent, or Firm—Robert M. Sigler

[57] ABSTRACT

A vehicle suspension uses actuators between sprung and unsprung masses, each actuator comprising a brushless dynamoelectric machine having a low inertia rotor engaged with a rotary/linear motion converter or conversion between dynamoelectric machine torque and linear actuator force. A control circuit for each machine applies current from an electric power source to the dynamoelectric machine in response to rotor position sensors and an input control signal to produce a desired actuator force providing motoring or generating action by the dynamoelectric machine. A common supply bus connecting the electric power source and dynamoelectric machines allows the dynamoelectric machines in generating mode to provide electric power to the dynamoelectric machines in motoring mode. Transient storage capacitors across the supply bus, current limiting from the supply bus to the storage battery, a dump resistance and dump switch responsive to battery voltage, and a supplementary alternator are also provided.

7 Claims, 4 Drawing Sheets

ACTIVE VEHICLE SUSPENSION WITH BRUSHLESS DYNAMOELECTRIC ACTUATOR

BACKGROUND OF THE INVENTION

This is a continuation-in-part of USSN 07/540,989, filed by the same inventors on June 20, 1990 and assigned to the same assignee.

This invention relates to a fully active suspension and ride control for a motor vehicle. A typical motor vehicle includes a sprung mass suspended on a plurality of unsprung masses, each of the latter including a wheel and being connected to the sprung mass by suspension apparatus which normally includes spring means and damping means. Active suspension apparatus has been proposed in which an actuator capable of providing energy to the suspension is responsive to a real time control system to generate forces between the sprung and unsprung masses in order to meet certain ride and attitude criteria in an active manner. The criteria may include minimization of sprung mass accelerations for good ride, body control and handling, and minimization of unsprung mass acceleration for tire road holding within the constraint of a limited relative movement between sprung and unsprung masses.

Such actuators must be capable of fast application of large forces to the suspension, with capability for rapid reversal of force direction. Hydraulic actuators have been proposed in the prior art for most such applications. At least one fully active suspension with hydraulic actuators, designed originally for a racing vehicle, has attracted a great deal of attention and has been favorably received by those who have driven a vehicle so equipped. However, the system has several disadvantages which, at the present time, limits its general use in mass produced motor vehicles, among which are high expense, large power consumption, bandwidth limitations and the requirement of a high pressure hydraulic system.

The prior art further includes many examples of controlled passive shock absorber devices. However, although these devices and systems may be effective to modify the forces on the suspension system, they do so only in a passive manner: that is, they are incapable of providing energy to the suspension system. They are thus somewhat limited in their suspension control capabilities.

There is some prior art showing dynamoelectric shock absorbers which convert a portion of the energy generated by suspension movements into electrical energy and provide it to a storage device for use by other electrical apparatus on the vehicle. However, these devices are also purely passive; and they do not share power with each other directly.

SUMMARY OF THE INVENTION

This invention proposes a fully active motor vehicle suspension using rotary brushless dynamoelectric actuators rather than hydraulic actuators. The vehicle has an electric power source and a sprung mass suspended on a plurality of unsprung masses, with each unsprung mass connected to the sprung mass through an actuator comprising a rotary brushless dynamoelectric machine. The dynamoelectric machine has a rotor engaged with a rotary/linear motion converter for conversion between dynamoelectric machine torque and linear actuator force. Each actuator further comprises a dynamoelectric machine control circuit effective to control current between the electric power source and the dynamoelectric machine in response to an input control signal to produce a desired actuator force providing motoring or generating action by the dynamoelectric machine.

Each dynamoelectric machine preferably has a low inertia permanent magnet rotor, a plurality of stator windings and a plurality of rotor position sensors, the dynamoelectric machine control circuit comprises a bridge circuit effective to switch the stator windings alternately in series with the electric power source in response to the position sensors and the input control signal so that the dynamoelectric machine acts alternatively as a brushless motor to provide an active suspension force in the direction of suspension travel or as a brushless permanent magnet alternator to provide a damping force opposed to the direction of suspension travel. The inertia of the rotor is minimized by the use of high strength permanent magnets in a compact, brushless design; and the current levels are easily controlled whether the dynamoelectric machine is in a motoring or generating mode of operation. The change in actuator force between motoring and generating action is automatic and very fast, since it does not require mass acceleration. Therefore the actuators have much greater bandwidth than valved hydraulic suspension controls, in which movement of valve members in a high pressure environment is required for a change in actuator force.

A common supply bus connects the electric power source and actuators to allow the dynamoelectric machines in generating mode to provide electric power directly to the dynamoelectric machines in motoring mode or to any other electric load on the bus. Thus, the total power necessary from the electric power source is reduced to a much smaller level than the estimated 6-10 hp required by a hydraulic system; in and the efficiency of the system is improved. In fact, the efficiency of the system is further improved by the direct common bus connections to the dynamoelectric machines.

Further elements are included to provide a total power management system for the suspension apparatus. The electric power source comprises a storage battery which may be charged by the suspension apparatus as in the prior art. However, current limiting elements and battery voltage responsive dump apparatus prevent the battery from being charged too fast or too much; and capacitors across the conductors of the common supply bus provide transient charge storage. A supplemental alternator and diode bridge with chopper control may provide supplementary electric power for other high voltage loads.

The rotor position sensors of each actuator provide signals of the magnitude and direction of relative sprung mass/unsprung mass velocity; while the current between the electric power source and the dynamoelectric machine provides signals of the magnitude and direction of the relative sprung mass/unsprung mass force. Thus, load sensors are not required for relative sprung mass/unsprung mass force feedback signals to the control; and relative sprung mass/unsprung mass velocity signals may be obtained directly from the actuators without the need for absolute acceleration sensors at the four corners of the sprung mass and without the signal processing problems involved in differentiating a sprung mass/unsprung mass position signal or integrating an unsprung mass acceleration signal.

Additional advantages of the invention are found in the electrical power wiring for the dynamoelectric machines, which is less costly and more reliable than the high pressure fluid conduits required by a hydraulic system. Further details and advantages of the invention will be apparent from the accompanying drawings and following description of a preferred embodiment.

DESCRIPTION OF THE PREFERRED EMBODIMENT

Figure 1:
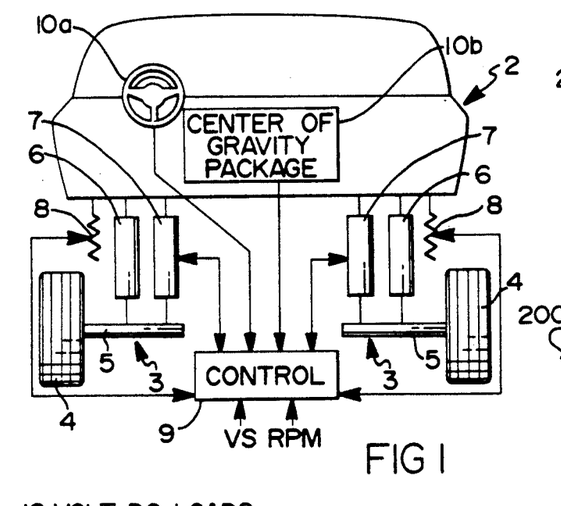
FIG. 1 is a schematic diagram of part of a motor vehicle with an active suspension according to this invention.

Referring to FIG. 1, a motor vehicle comprises a body or sprung mass 2 suspended on a plurality of wheel assemblies or unsprung masses 3. There are normally four such unsprung masses 3, one near each corner of the vehicle, although the invention is not limited to this number and only two are shown in FIG. 1. Each unsprung mass 3 comprises a wheel 4 rotatably mounted on a suspension member 5, such as a lower control arm, for example, with suspension member 5 connected to sprung mass 2 through a spring 6 and actuator 7. Spring 6 may comprise any known vehicle suspension spring, including a standard coil spring; but, in this embodiment, it is shown as an air spring capable of vehicle steady state level adjustment. In order to facilitate such level adjustment, a standard vehicle height sensor 8 is shown, which sensor provides an output signal of sprung mass position at the corner relative to the unsprung mass position at that corner. However, such vehicle leveling is not a necessary part of this invention but, rather, a supplement thereto. A control 9 receives input signals from various vehicle mounted sensors and provides outputs to air springs 6 and actuators 7 to control the level, ride and handling of the vehicle. Many such active suspension controls are known in the prior art; and the choice of a particular control is not a part of this invention. Such controls may provide inputs such as vehicle speed VS, engine speed RPM, vehicle steering position from a steering angle sensor 10a, and/or vehicle center of gravity information such as fore-/aft acceleration, lateral acceleration and yaw rate from appropriate sensors in a center of gravity package 10b.

Other inputs relating to sprung/unsprung mass movement may be obtained from vehicle height sensors 8 and/or the apparatus of this invention in a manner to be described.

Figure 2:
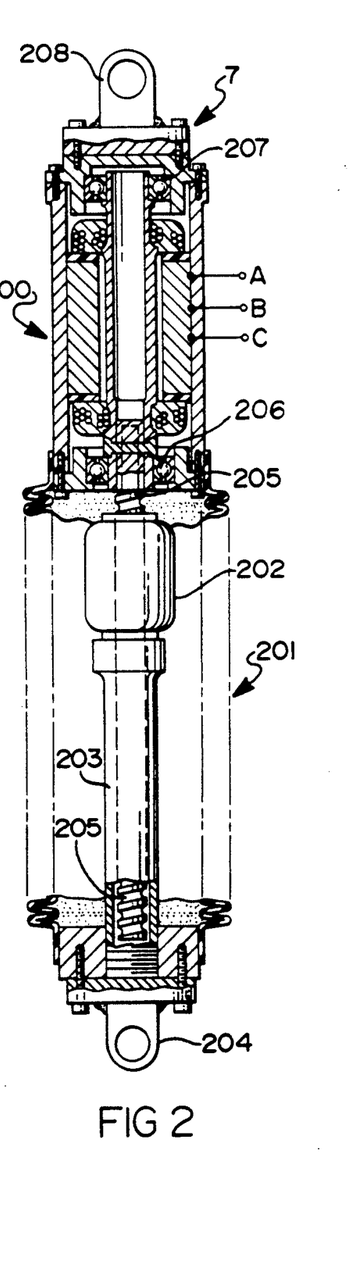
FIG. 2 is a partially cutaway view of an actuator for use in the suspension of the vehicle of FIG. 1.

Referring to FIG. 2, each of actuators 7 comprises a multi-phase, brushless dynamoelectric machine 200 and a linear/rotary motion converter 201. Linear/rotary motion converter 201 is a ball nut and screw apparatus in which a ball nut 202 is connected by a hollow, rigid connector 203 to a lower mounting member 204, which may be connected to suspension member 5 in FIG. 1. A screw 205 is rotatably attached through bearing assemblies 206 and 207 to an upper mounting member 208, which may be connected to sprung mass 2 in FIG. 1. Clearly, these connections could be reversed, if desired. Screw 205 carries the rotor of dynamoelectric machine 200 for rotation therewith. Screw 205 and ball nut 202 thus act to convert the extension and compression of actuator 7 with linear rebound and jounce movement of sprung mass 2 and unsprung mass 3 to a rotational movement of the rotor of dynamoelectric machine 200, and vice versa, with extension corresponding to rotation in one direction and compression corresponding to rotation in the opposite direction. The three armature phase windings, shown in FIG. 4 as 14a, 14b and 14c, are connected in a star (or delta) arrangement with the free ends thereof connected to output terminals A, B and C.

Actuator 7 is mechanically similar to the electric damper described in U.S. Pat. No. 4,815,575 to Murty mentioned above. In that patent, its use as a damper is described, wherein the mechanical energy of suspension movement is converted into electric energy and dissipated as resistive heat loss in an associated external circuit to control what is essentially a damping force. However, being a dynamoelectric machine, it is also useful as an electric to mechanical actuator which, when provided with a suitable electric voltage and current, generates a force to drive the suspension in a desired manner for full active control. In the apparatus described herein, four actuators 7, one at each corner of the vehicle, are controllable as a fully active, full vehicle suspension, with each being separately provided with electric power in amount and direction so as to exert a desired suspension force at that corner of the vehicle. The electric power at each corner may be either active, in which case power is absorbed by the dynamoelectric machine at that corner, or dissipative, in which power is generated by the dynamoelectric machine at that corner.

Figure 7:
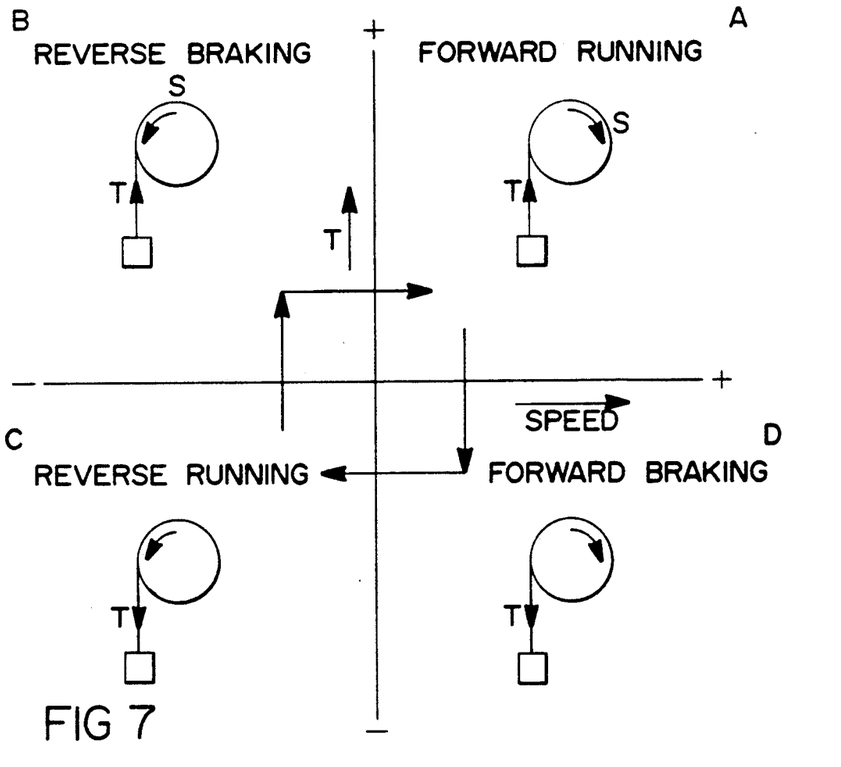
FIG. 7 illustrates the four quadrant power operation of the actuators on a graphical grid of actuator torque vs. speed.

More particularly, FIG. 7 describes the four quadrant power operation of the actuators. The grid includes a horizontal axis which indicates the speed and direction of actuator motion (that is, of relative sprung/unsprung mass movement) and a vertical actuator torque axis indicating the torque exerted by the actuator. In quadrant A, torque and speed are both positive; and the torque is thus exerted in direction to increase the speed of suspension movement. This requires active power to the suspension; and the actuator is acting as a motor. In quadrant D, the actuator movement is in the same direction; but the torque is negative, so as to oppose this motion. The power is thus dissipative; and the actuator is acting as a generator. The apparatus is capable of changing between quadrants A and D practically instantaneously, since no change in direction of actuator movement is required and switching is electronic.

In quadrant C, the direction of actuator motion is opposite that in quadrant A, but so is the direction of actuator torque. Therefore, as in quadrant A, the torque is applied to increase actuator speed; and the actuator acts as a motor to provide active power to the suspension. In quadrant B, however, the torque is reversed in direction to oppose the motion of the actuator, which acts as a generator while dissipating suspension power. Thus, changes between quadrants B and C can also take place practically instantaneously, since there is no required change in actuator movement. Thus, with the control to be described, the apparatus is capable of switching between active and dissipative power smoothly and quickly for high bandwidth, real time active suspension control.

Figure 3:
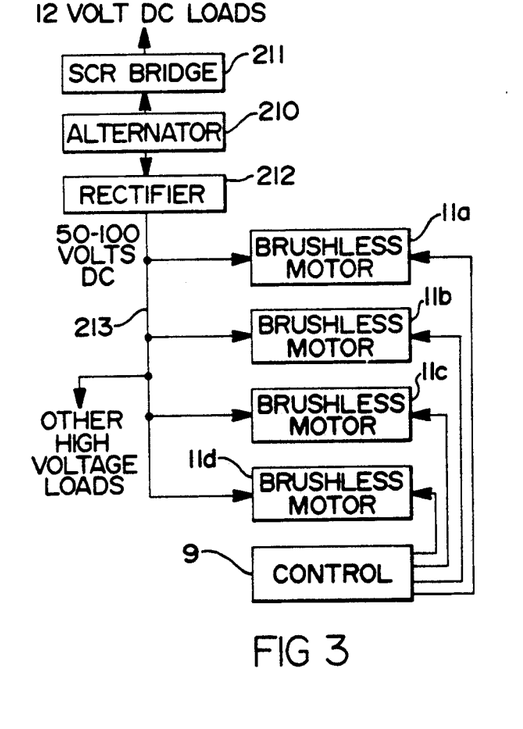
FIG. 3 is a block and circuit diagram showing the electrical power connections for a plurality of actuators of the type shown in FIG. 2 for the suspension of FIG. 1.

The electrical control and power connections of actuators 7 are shown in FIG. 3. Brushless dynamoelectric machines operating as motors from the normal vehicle 12 volt electrical supply are not cost effective at the present time, since the solid state inverter has to carry large current. Therefore, a PM alternator 210 having a normal winding to provide electric power at 12 volts DC through a normal SCR bridge 211 is also provided with a high voltage winding which provides electric power at 50-100 volts DC through a high voltage rectifier 212. The 12 volt DC supply is provided to the normal 12 volt vehicle electric loads in the normal manner; but the 50-100 volt supply is provided to the dynamoelectric machines 11a, 11b, 11c, and 11d of actuators 7 at the four corners of a vehicle body on a common high voltage DC bus 213. Several other vehicle electrical loads might conceivably be supplied more efficiently from bus 213 at the higher voltage; and the electric power generated by each of dynamoelectric machines 11a-11d while damping in its generating mode is also available for such other loads to further increase the efficiency and therefore the fuel economy of the vehicle. Such loads might include an electrically heated windshield, electric power steering or electrically powered anti-lock brakes. Control 9 is also shown in FIG. 3 to demonstrate that it separately controls each brushless dynamoelectric machine 11a-11d.

Figure 4:
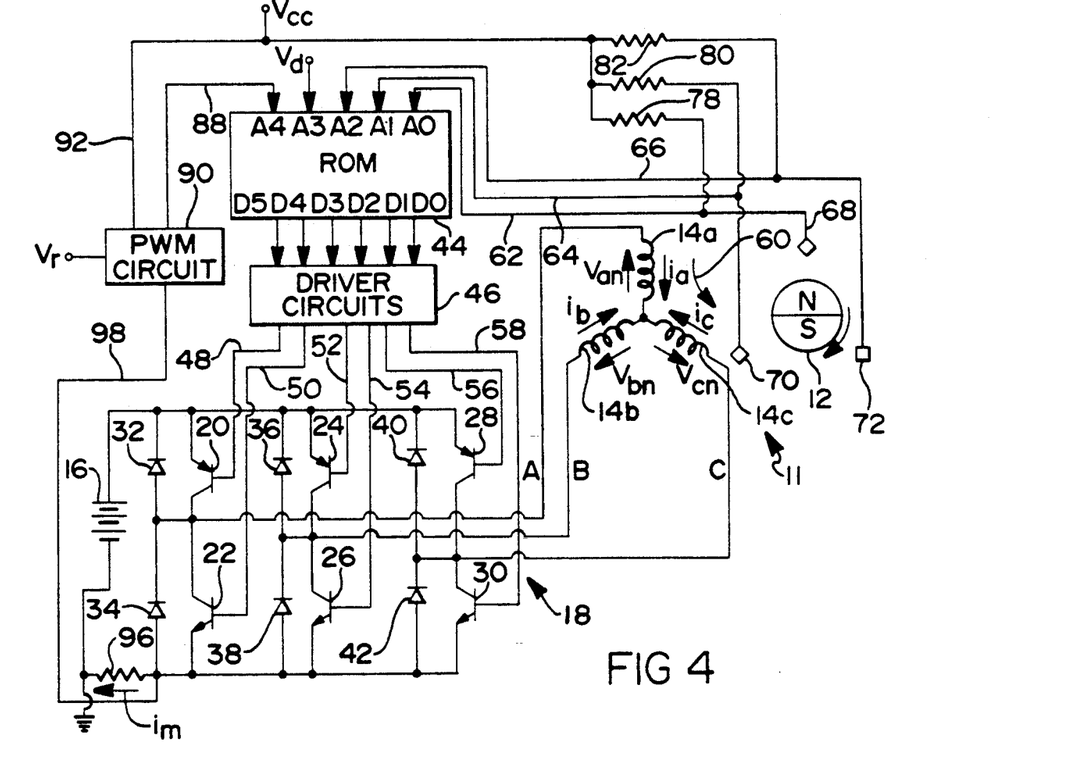
FIG. 4 is a block and circuit diagram of a brushless dynamoelectric machine and control for use as part of the actuator of FIG. 2 in the suspension of FIG. 1.

Each actuator 7 includes a dynamoelectric machine control which, in response to a pair of control signals from control 9, provides the desired operation of the actuator. The control used is essentially the same as that shown in the U.S. Pat. No. 4,544,868, issued to Balarama V. Murty on Oct 1, 1985. Such a control is shown in FIG. 4, wherein reference numeral 11 generally designates a brushless dynamoelectric machine, comprising a permanent magnet rotor 12 and three star-connected stator windings 14a, 14b and 14c. Stator windings 14a-14c are adapted to be energized with current from the high voltage bus, which is shown in this Figure as high voltage DC power source 16, through the full-wave bridge inverter 18. The bridge comprises six power transistors 20, 22, 24, 26 28 and 30 connected in the conventional bridge configuration, each of which has one of six freewheeling diodes 32, 34, 36, 38, 40 and 42 connected across its emitter-collector junction. The winding energization is controlled by a read-only memory (ROM) or programmable logic array (PLA) 44 which directs a driver circuit 46 via data lines D0-D5 to supply drive current to the various bridge transistors via lines 48, 50, 52, 54, 56, and 58. Thus, when data lines D0 and D5 are at a logic 1 voltage level, driver circuit 46 biases transistors 20 and 30 conductive via lines 48 and 58 to energize windings 14a and 14c with current in the direction indicated by arrow 60. When the voltage on data lines D0 and D5 falls to a logic zero level, the winding energization through transistors 20 and 30 is interrupted, and inductive energy stored in windings 14a and 14c is returned to the battery 16 through freewheeling diodes 34 and 40. The other bridge transistors are similarly controlled by the data lines of ROM 44 to produce different winding energization patterns.

The logic level present at data lines D0-D5 of ROM 44, and hence, the winding energization pattern, is controlled as a function of the logic level of the five ROM address inputs A0-A4. Inputs A0, A1 and A2 are obtained directly via lines 62, 64 and 66 from sensors 68, 70 and 72, which are situated 120 electrical degrees apart in the magnetic field of rotor 12 and which provide an indication of rotor position. In the illustrated embodiment, sensors 68, 70 and 72 are of the Hall Effect type; however, sensors of another type or any armature position encoder could be used. The sensors 68, 70 and 72 are normally in a high impedance state and toggle to a low impedance state when the rotor is in a predetermined position. A 5 volt supply $V_{cc}$ suitable for control electronic devices and chips is provided at a terminal similarly labeled; and pull-up resistors 78, 80 and 82 connect terminal $V_{cc}$ to address input lines 62, 64 and 66, respectively. Thus, address inputs A0, A1 and A2 are normally held at a logic one voltage level and fall to a logic zero voltage level when the respective sensor 68, 70 or 72 is toggled to its low impedance state.

Input A3 of ROM 44 is provided by control 9 with a digital direction signal $V_d$ which may be, for example, high for forward conduction and low for reverse conduction. Of course, a further input could be provided for indicating that the machine is to be maintained off, or de-energized. Input A4 of ROM 44 is obtained via line 88 from a pulse-width modulation (PWM) circuit 90. PWM circuit 90 is connected to terminal $V_{cc}$ line 92. A shunt resistor 96 is connected in series between power source 16 and inverter 18, and a line 98 connects the inverter side of shunt resistor 96 as an input to PWM circuit 90. As will be understood by those skilled in the art, the voltage across shunt 96, and hence, the voltage on line 98 is directly proportional by a known factor to the DC line current $i_m$ supplied to dynamoelectric machine 11 by power source 16. Such voltage is referred to herein as the DC line current signal. PWM circuit 90 is described in detail below with reference to FIG. 6.

Figure 5:
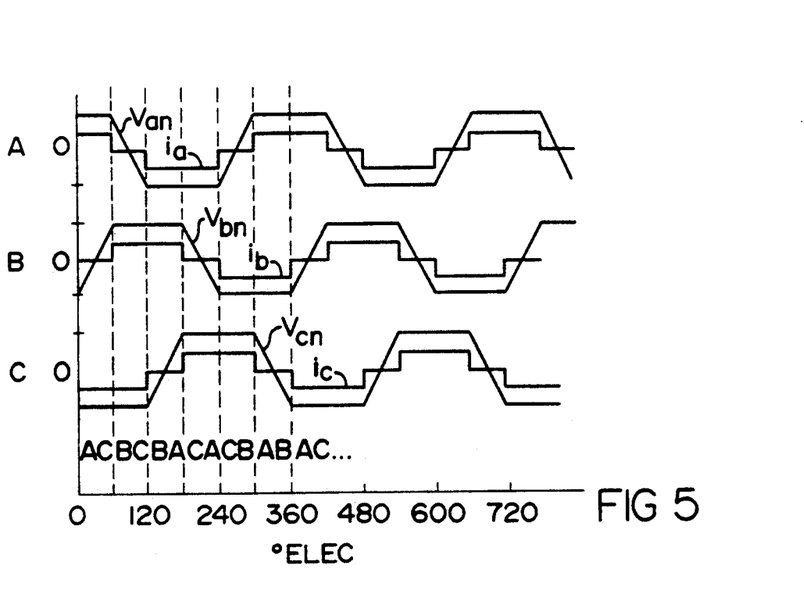
FIG. 5 shows graphs depicting idealized phase voltage and phase current waveforms for each of the windings in the brushless dynamoelectric machine and control of FIG. 4.

FIGS. 5A-5C depict idealized voltage and current waveforms as a function of rotor position for the stator windings 14a-14c during forward armature rotation. FIG. 5A depicts the phase voltage $V_{an}$ and phase current $i_a$ for the phase winding 14a; FIG. 5B depicts the phase voltage $V_{bn}$ and the phase current $i_b$ for phase winding 14b; and FIG. 5C depicts the phase voltage $V_{cn}$ and the phase current $i_c$ for phase winding 14c. Since the bridge transistors 20-30 are rendered conductive two at a time as described above in reference to FIG. 4, six different stator winding energization patterns are possible. Such patterns are designated herein as AC, AB, CA, CB, BA and BC. The first designation letter refers to the stator winding (14a, 14b or 14c) connected through a bridge transistor to the positive terminal of battery 16 and the second designation letter refers to the stator winding connected through a bridge transistor to ground potential. Each stator winding energization pattern produces a distinct stator magnetic field, and the conduction of the various bridge transistors is controlled by ROM 44 and rotor position sensors 68–72, such that the magnetic axis of the stator maintains a predetermined relationship with respect to the magnetic field of the rotor. More particularly, the stator winding energization patterns are selected so that the magnetic axis of the stator leads the rotor field axis by between 60 and 120 electrical degrees, the motor torque thereby produced being maximum when the phase difference is 90 electrical degrees. The information for maintaining this sequence is obtained from rotor position sensors 68–72 which, due to their orientation with respect to the rotor magnetic field, indicate six distinct regions of rotor position. If the forward direction of armature rotation is defined as being clockwise, the correct stator winding energization pattern sequence is AC, BC, BA, CA, CB and AB. Each such stator winding energization pattern is maintained for 60 electrical degrees of rotor rotation as indicated in FIG. 5, and the patterns taken together occupy 360 electrical degrees or one complete cycle of stator winding energization. As an illustration of the graphs of FIG. 5, the stator winding energization pattern AC produces positive phase voltage ($V_{an}$) and phase current ($i_a$) in the winding 14a, and negative phase voltage ($V_{cn}$) and phase current ($i_c$) in the winding 14c. The subsequent stator winding energization pattern BC maintains the prior phase voltage and current in winding 14c and produces positive phase voltage ($V_{bn}$) and phase current ($i_b$) in the winding 14b. Reverse armature rotation is obtained by providing the opposite stator winding energization pattern for a given rotor position. Thus, the stator winding energization pattern sequence for reverse armature rotation is CA, BA, BC, AC, AB and CB.

Figure 6:
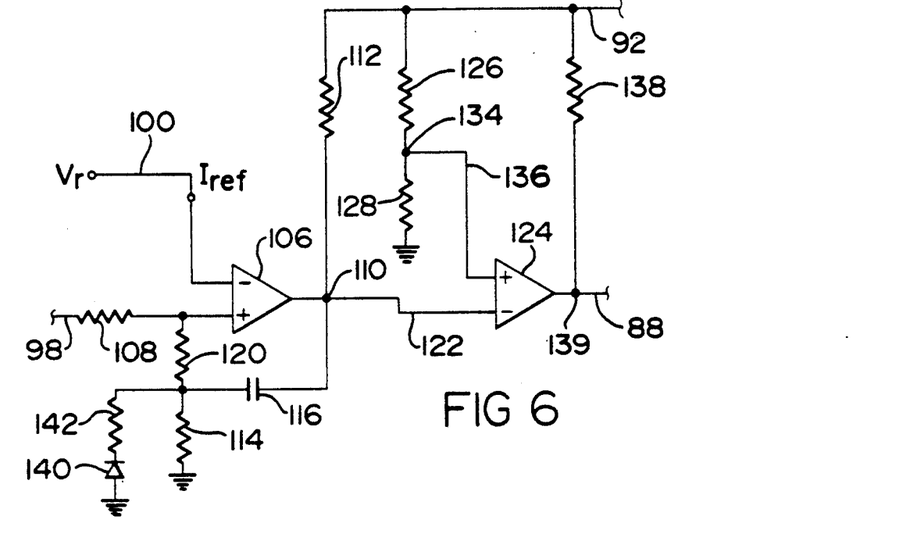
FIG. 6 is a circuit diagram of the pulse-width modulation circuit depicted in the brushless dynamoelectric machine and control of FIG. 4.

The energization patterns described above are pulse-width modulated by pulse-width modulation circuit 90, which is shown in detail in FIG. 6. Referring now more particularly to that Figure, it will be seen that the conductors common to FIGS. 4 and 6 have been assigned the same reference numerals. Thus, conductor 88 connects PWM circuit 90 to address input A4 of ROM 44, conductor 92 connects PWM circuit 90 to the supply voltage $V_{cc}$, and conductor 98 connects PWM circuit 90 to the inverter side of shunt 96. Functionally, PWM circuit 90 operates to establish a reference voltage corresponding to a reference DC line current and to disable energization of the windings for a predetermined period of time whenever the actual DC line current exceeds the reference line current. The reference voltage is provided as an input $V_r$ from control 9. This input and the directional input $V_d$ to A3 comprise the control inputs to each actuator which establish the direction and amplitude of desired actuator force for the controlled actuator.

The reference voltage on line 100 is connected to the inverting input of a comparator 106. The voltage on line 98 is representative of the actual DC line current; and such voltage is applied through input resistor 108 to the non-inverting input of comparator 106. So long as the actual DC line current stays below the reference current $I_{ref}$, comparator 106 is biased to its low impedance state maintaining its output terminal 110 substantially at ground potential. When the DC line current rises above reference current $I_{ref}$, however, comparator 106 is biased to its high impedance state and the voltage at terminal 110 rises at once to a voltage determined by the relative resistances of resistors 112 and 114. Thereafter, capacitor 116 charges toward the supply voltage on line 92 through the resistors 112 and 114, and the non-inverting input of comparator 106 is maintained at a relatively high voltage potential through resistor 120. Thus, comparator 106 cannot change states while capacitor 116 is charging, even though the voltage on line 98 falls below the reference voltage level.

Terminal 110 is connected via line 122 to the inverting input of comparator 124. A voltage divider comprising resistors 126 and 128 defines a reference voltage at terminal 134; and such reference voltage is applied via line 136 to the non-inverting input of comparator 124. A pull-up resistor 138 normally maintains the voltage potential at the comparator output terminal 139 at a relatively high level; and comparator 124 is effective when the voltage at terminal 110 rises above the reference voltage at terminal 134 to lower the voltage potential at terminal 139 to substantially ground potential. As indicated earlier, the voltage at terminal 139 is applied via line 88 to the A4 address input of ROM 44 for the purpose of controlling the stator winding energization. Whenever the voltage applied to the A4 address input of ROM falls to a logic zero voltage potential, the bridge transistors 20–30 are all biased non-conductive to interrupt the stator winding energization. When the A4 address input of ROM 44 is returned to a logic 1 voltage potential, the normal energization pattern based on rotor position is resumed. For a more complete description of the details of operation of this control, please refer to the aforementioned Pat. No. 4,544,868.

Control 9 is responsible for receiving inputs from the vehicle sensors, applying these to an internally stored suspension algorithm for generating direction signals $V_d$ and reference voltages $V_r$ for desired force levels and applying them to each actuator 7. Control 9 may be a digital computer including a central processor unit (CPU) with accompanying clock and timing circuitry, RAM, ROM and input/output apparatus. The program itself will periodically read inputs with A/D conversion as necessary, repeatedly run an algorithm program, and generate the outputs with D/A conversion as required. This invention is not limited to any particular control algorithm; and many such algorithms known in the prior art may be used.

One of the important parameters, the relative sprung mass/unsprung mass velocity, which is used in most such algorithms, can be determined from the dynamoelectric machine of the actuator. The position sensors 68, 70, 72, as previously described, provide voltage signals to address inputs A0, A1, A2, respectively, of ROM 44. These voltage signals toggle between high and low voltage levels in predetermined rotor rotational positions. For example, given the two pole rotor shown in FIG. 4 with position sensors 68, 70, 72 at 0, 120 and 240 rotational degrees, respectively, each position sensor will generate a square wave output having two voltage transitions per rotor rotation, with each sensor's output being 120 degrees removed in phase from the outputs of the other two sensors. This will produce a voltage transition from one of the sensors 68, 70, 72 every 60 degrees of rotor rotation.

Thus, the voltage signals from position sensors 68, 70, 72 provide voltage transition pulses at a rate proportional to the magnitude of the relative sprung mass/unsprung mass velocity at the respective wheel, with the resolution of the signal increasing with the number of poles of rotor 12. In addition, the order of the sensors which generate consecutive pulses indicates the direction of rotor rotation. The output signals of position sensors 68, 70, 72 may thus be further provided to control 9 as relative sprung mass/unsprung mass velocity signals for the respective wheels. Control 9 may combine the three signals into a single square wave for maximum resolution of velocity magnitude measurement by timing the period between voltage transitions or counting transitions within a reference period and may determine velocity direction from the order of transitions due to two of the three sensors. This eliminates the need for external sensors for such signals. This is similar in principle to the relative sprung mass/unsprung mass velocity sensing in the aforementioned Patent to Murty 4,815,575; but it differs therefrom in that there is no need in the apparatus of this disclosure to provide additional zero crossing detection circuitry for the phase voltages, since the position sensors 68, 70, 72 included as part of the brushless motor control inherently provide usable signals. This is an important advantage in an active suspension system, since (1) the relative sprung-/unsprung mass velocity is a very important input to a vehicle suspension control, (2) inexpensive velocity sensors are not generally available, and (3) the accurate derivation of relative sprung/unsprung mass velocity from a position sensor by differentiation is not a simple matter, but introduces additional difficulties and/or expense.

In addition, the force exerted between the sprung and unsprung masses at each wheel is proportional to the average DC line current $i_m$ through resistor 96 of the respective brushless motor control circuit. The average voltage signal provided on line 98, which is proportional to this current, will thus provide a sprung mass-/unsprung mass force signal, which may also be provided to control 9 if desired for use in the suspension control algorithm. It should be noted that this voltage will be negative, with respect to ground in FIG. 4, when the actuator is generating electrical power; and, in fact, the sign of this voltage indicates whether the force is associated with active or dissipative power. Thus, with this apparatus, no load cells are needed to measure the force between the sprung and unsprung masses or determine the active or dissipative nature of the associated power.

An additional group of center of gravity signals from the center of gravity package 10b, as well as the vehicle speed VS and engine speed RPM, are available, as discussed in connection with FIG. 1. These signals are available primarily for control of low frequency suspension movements.

Figure 8:
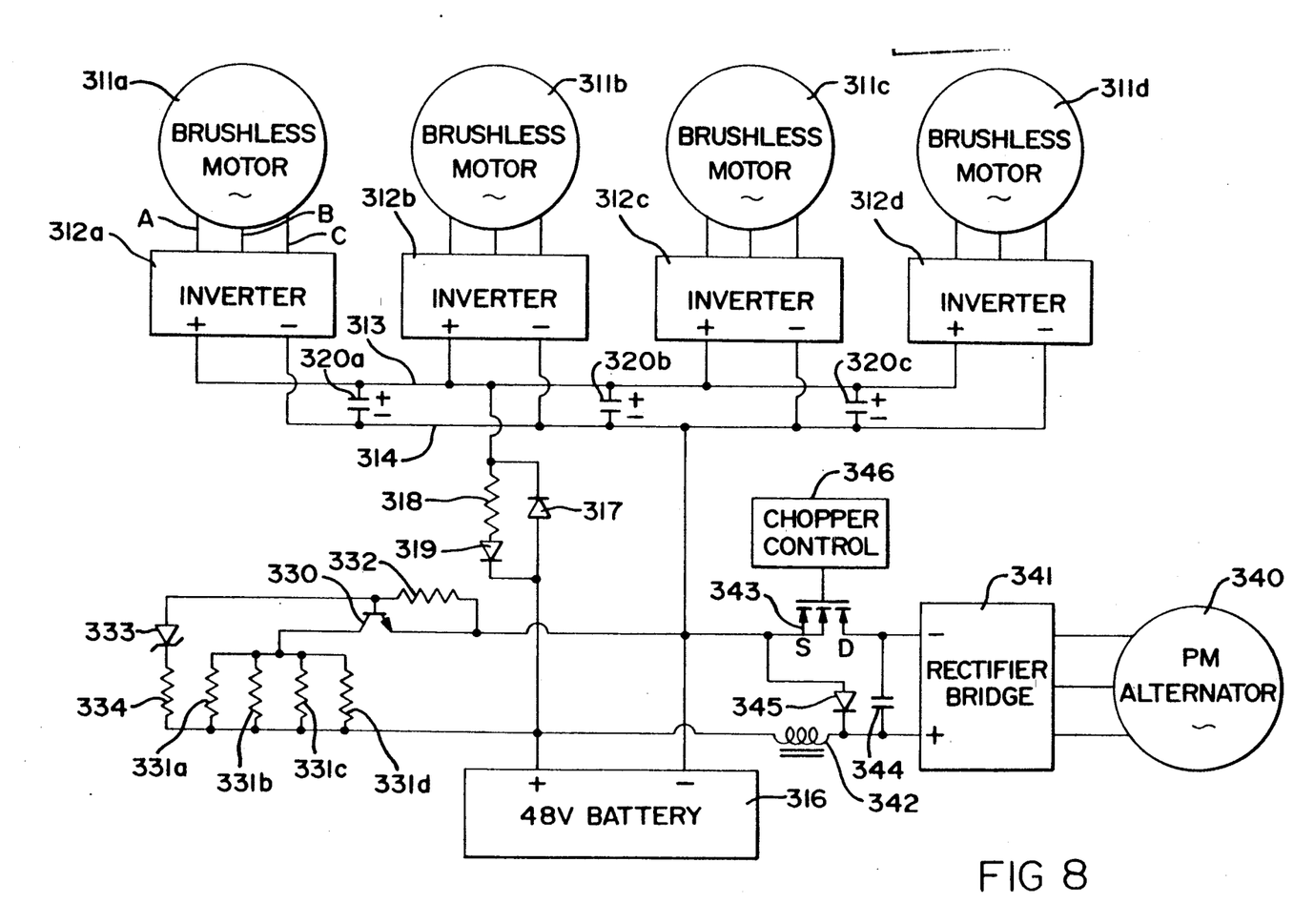
FIG. 8 is a block and circuit diagram of another embodiment of the electrical power control of this invention.

Referring to FIG. 8, a brushless dynamoelectric machine 311a is connected through an inverter 312a, such as that shown in FIG. 4, to a 48 volt common supply bus comprising a supply conductor 313 and a ground conductor 314. The connection of inverter 312a to dynamoelectric machine 311a is through three phase lines A, B and C as in FIG. 4; the connection of inverter 312a to the 48 volt bus is as shown in the connection to battery 16 in FIG. 4. Dynamoelectric machines 311b-d and inverters 312b-d are similarly connected. A 48 volt storage battery 316 has a negative terminal connected to ground conductor 314 and a positive terminal connected to supply conductor 313 through a forward connected diode 317 in parallel with the series combination of a resistor 318 and a reverse connected diode 319. Transient energy storing capacitors 320a-c are connected in parallel between conductors 313 and 314.

In operation, each of the brushless dynamoelectric machines 311a-d might be using energy in motoring mode to drive suspension apparatus or generating energy in generating mode as it is driven by suspension apparatus. Those machines in motoring mode require electric current, which is delivered through the common supply bus comprising conductors 313 and 314 from capacitors 320a-c if they are charged to more than 48 volts or otherwise from battery 316. However, one or more of dynamoelectric machines 311a-d might be opposing suspension movement in generating mode. The electric power thus generated is also directly available to the other machines through common supply bus 313, 314. Each of machines 311a-d will be switching between generating and motoring modes often, at unpredictable times. At any moment, the power generated by those of machines 311a-d in generating mode might exceed the requirement of the others of machines 311a-d for power; and the excess will be stored in capacitors 320a-c temporarily. Alternatively, the power required by those of machines 311a-d in power consuming mode may exceed the power available from the others of machines 311a-d in generating mode. In this case, additional power will be drawn from capacitors 320a-c, if they are charged above 48 volts, and otherwise directly from battery 16 through diode 317. If capacitors 320a-c are left charged above 48 volts for any appreciable time, they will tend to recharge battery 16 at a limited rate through resistor 318 and diode 319.

It is possible that more electric energy will be generated than consumed by machines 311a-d over a period of time. To prevent overcharging of battery 16, a dump switch may be provided as shown by NPN transistor 330 having an emitter connected to ground conductor 314 and a collector connected to the positive terminal of battery 16 through a dump resistance comprising a plurality of parallel resistors 331a-d. A resistor 332 connects the base of transistor 330 to ground line 314; and a zener diode 333 and resistor 334 in series connect the base of transistor 330 to the positive terminal of battery 16. These elements comprise a bias circuit effective to control the conduction of transistor 330 in response to the voltage of battery 316. In operation, the breakdown voltage of zener diode 333 is chosen to conduct when the voltage of battery 16 exceeds some predetermined value above 48 volts. This conduction biases transistor 330 into conduction to discharge battery 316 through resistors 331a-d, which are high wattage resistors with heat sinking capable of dissipating large amounts of power. This dumps charge from battery 316 to prevent overcharging thereof.

The common supply bus comprising conductors 313 and 314 may also be used to supply other high voltage loads; and, in this case, the overall power consumed by these loads in addition to machines 311a-d may exceed the power generated by machines 311a-d. Therefore, an additional electric power source may be added to the system in the form of a PM alternator 340 providing a 48 volt DC output through a rectifier bridge 341 having a positive output connected through choke 342 to the positive terminal of battery 16 and a ground output connected through a chopper FET 343 to ground line 314. A capacitor 344 may be connected across the positive and ground outputs of rectifier bridge 341; and a diode 345 may be connected from ground line 316 to the positive output of rectifier bridge 341 for protection. FET 343 has a switching control gate connected to a chopper control 346 to control the power provided by alternator 340 to the system.

The embodiments of the invention in which an exclusive property or privilege is claimed are defined as follows:

1. A suspension for a vehicle having an electric power source and a sprung mass suspended on a plurality of unsprung masses, each unsprung mass being connected to the sprung mass through an actuator comprising a rotary brushless dynamoelectric machine having a rotor engaged with a rotary/linear motion converter for conversion between dynamoelectric machine torque and linear actuator force, the dynamoelectric machines being connected with each other for electrical power through a common supply bus, each actuator further comprising a dynamoelectric machine control effective to apply current from the electric power source to the dynamoelectric machine through the common supply bus in response to an input control signal to produce a desired actuator force providing motoring or generating action by the dynamoelectric machine, the common supply bus permitting one of the dynamoelectric machines in generating action to provide electric power directly through the common supply bus to another of the dynamoelectric machines in motoring action.

2. The suspension of claim 1 in which the electric power source comprises a storage battery, the common supply bus comprises a supply conductor and a ground conductor connected to the terminals of the storage battery, and a capacitance is connected across the supply and ground conductors for temporary charge storage as current is generated by the dynamoelectric machines in generating mode at a rate higher than it can be used by the dynamoelectric machines in motoring mode and accepted by the storage battery.

3. The suspension of claim 1 in which the electric power source comprises a storage battery and the common supply bus is connected to the storage battery through circuit means which limit the rate at which charge may be provided from the dynamoelectric machines to the storage battery compared with the rate at which charge may be provided from the storage battery to the dynamoelectric machines.

4. The suspension of claim 3 in which the common supply bus comprises a supply conductor and a ground conductor and a capacitance is connected across the supply and ground conductors for temporary charge storage.

5. The suspension of claim 3 further comprising a dump resistance connected across the storage battery through a dump switch responsive to predetermined high voltage of the storage battery to conduct current from the storage battery through the dump resistance and thus prevent excessive charging of the storage battery by the dynamoelectric machines.

6. The suspension of claim 5 in which the dump switch is a transistor having a pair of current carrying electrodes connected in series with the dump resistance and a control electrode connected to a biasing circuit connected across the storage battery to cause current conduction in the transistor in response to the predetermined high voltage of the storage battery.

7. The suspension of claim 2 in which the electric power source further comprises a vehicle driven alternator and rectifier bridge connected in parallel with the storage battery through a chopper control.

* * * * *